United States Patent
Le Boudouil et al.

(10) Patent No.: US 11,498,879 B2
(45) Date of Patent: Nov. 15, 2022

(54) METHOD FOR BRAZING TITANIUM ALLOY COMPONENTS WITH ZIRCONIA-BASED CERAMIC COMPONENTS FOR HOROLOGY OR JEWELLERY

(71) Applicant: Comadur SA, Le Locle (CH)

(72) Inventors: Damien Le Boudouil, Morteau (FR); Alexandre Netuschill, Le Cerneux-Pequignot (CH)

(73) Assignee: Comadur SA, Le Locle (CH)

( * ) Notice: Subject to any disclaimer, the term of this patent is extended or adjusted under 35 U.S.C. 154(b) by 412 days.

(21) Appl. No.: 16/679,402

(22) Filed: Nov. 11, 2019

(65) Prior Publication Data
US 2020/0189983 A1   Jun. 18, 2020

(30) Foreign Application Priority Data
Dec. 14, 2018   (EP) .................................... 18212595

(51) Int. Cl.
*B23K 1/00*   (2006.01)
*C04B 37/02*   (2006.01)
(Continued)

(52) U.S. Cl.
CPC .......... *C04B 37/023* (2013.01); *B23K 1/0008* (2013.01); *C22C 14/00* (2013.01);
(Continued)

(58) Field of Classification Search
CPC ............ C04B 37/023; C04B 2237/124; C04B 2237/348; C04B 2237/403;
(Continued)

(56) References Cited

U.S. PATENT DOCUMENTS 4,763,828 A *  8/1988  Fukaya ................. C04B 37/026
                                                  228/124.1
5,413,603 A   5/1995  Noiles et al.
(Continued)

FOREIGN PATENT DOCUMENTS

CN    1850731 A    10/2006
EP    2 789 597 A1    10/2014
(Continued)

OTHER PUBLICATIONS

Korean Office Action dated Oct. 16, 2020 in Korean Application 10-2019-0157157 (with English translation), 10 pages.
(Continued)

*Primary Examiner* — Kiley S Stoner
(74) *Attorney, Agent, or Firm* — Oblon, McClelland, Maier & Neustadt, L.L.P.

(57) ABSTRACT

A method for brazing a first ceramic component and a second metal alloy component, to make a structural or external timepiece element, a zirconia-based ceramic is chosen for the first component and a titanium alloy for the second component, a first recess is made inside the first component, set back from a first surface in a junction area with a second surface of the second component, braze material is deposited on this first surface and inside each recess, the second surface is positioned in alignment with the first surface to form an assembly, this assembly is heated in a controlled atmosphere to above the melting temperature of the braze material, in order to form the braze in the junction area.

19 Claims, 2 Drawing Sheets

(51) Int. Cl.
*C22C 14/00* (2006.01)
*G04B 37/22* (2006.01)

(52) U.S. Cl.
CPC ...... *G04B 37/223* (2013.01); *C04B 2237/124* (2013.01); *C04B 2237/348* (2013.01); *C04B 2237/403* (2013.01); *C04B 2237/52* (2013.01); *C04B 2237/60* (2013.01); *C04B 2237/64* (2013.01); *C04B 2237/84* (2013.01)

(58) Field of Classification Search
CPC ............ C04B 2237/52; C04B 2237/60; C04B 2237/64; C04B 2237/84; C04B 2235/3203; C04B 2235/3206; C04B 2235/3208; C04B 2235/3217; C04B 2235/3225; C04B 2235/3418; C04B 2235/665; C04B 2237/595; C04B 37/026; C04B 35/486; C04B 37/02; C04B 2237/404; C04B 2237/407; C04B 2237/62; C04B 37/003; C22C 14/00; G04B 37/223; G04B 19/28; G04B 37/22; G04B 37/225; G04B 39/025; B23K 2103/18; B23K 1/0008; B23K 1/19; B23K 1/20; B23K 26/324; B23K 35/32; B23K 2103/172; B23K 35/30; G04D 3/0069; A44C 27/001; A44C 27/003
USPC ... 228/122.1–124.7, 165–169, 174, 245–255
See application file for complete search history.

(56) References Cited

U.S. PATENT DOCUMENTS

| | | | | |
|---|---|---|---|---|
| 6,027,010 A * | 2/2000 | Shira | ...................... | A63B 60/00 228/122.1 |
| 6,155,755 A * | 12/2000 | Kanada | ................... | B23B 27/18 407/119 |
| 6,221,513 B1 | 4/2001 | Lasater | | |
| 6,554,178 B1 * | 4/2003 | Tsukamoto | .......... | B23K 1/0008 228/122.1 |
| 8,447,402 B1 * | 5/2013 | Jiang | ........................ | B23K 1/19 607/36 |
| 2005/0092818 A1 * | 5/2005 | Warner | .............. | B23K 35/0238 228/245 |
| 2005/0145679 A1 | 7/2005 | Beyer et al. | | |
| 2014/0308539 A1 | 10/2014 | Witz et al. | | |
| 2014/0356701 A1 * | 12/2014 | Gong | .................. | H01M 50/183 429/185 |
| 2016/0060176 A1 | 3/2016 | Actis-Datta | | |
| 2017/0326664 A1 * | 11/2017 | Nuvolli | ................ | B23K 1/0008 |
| 2017/0341339 A1 | 11/2017 | Hoebel et al. | | |
| 2019/0031571 A1 | 1/2019 | Sandin | | |

FOREIGN PATENT DOCUMENTS

| | | |
|---|---|---|
| EP | 2 799 411 A1 | 11/2014 |
| EP | 3 243 593 A1 | 11/2017 |
| FR | 2 862 246 A1 | 5/2005 |
| JP | 56-61478 U | 5/1981 |
| JP | 59-3075 A | 1/1984 |
| JP | 59-180484 A | 10/1984 |
| JP | 63-249085 A | 10/1988 |
| JP | 2-107579 A | 4/1990 |
| JP | 7-144004 A | 6/1995 |
| JP | 2005-187315 A | 7/2005 |
| JP | 2016-520508 A | 7/2016 |
| KR | 10-1754092 | 7/2017 |
| WO | WO 99/58332 A1 | 11/1999 |
| WO | WO 2017/129705 A1 | 8/2017 |

OTHER PUBLICATIONS

European Search Report dated May 17, 2019 in European Application 18212595.5 filed on Dec. 14, 2018 (with English Translation of Categories of Cited Documents & Written Opinon).
Simoes, S., "Recent Progress in the Joining of Titanium Alloys to Ceramics", Metals, vol. 8, No. 11, 2018, 29 pages.
Combined Chinese Office Action and Search Report dated Sep. 3, 2021 in Chinese Patent Application No. 201811285608.2 (with English translation of Category of Cited Documents), 23 pages.
Office Action dated Dec. 17, 2020 in corresponding Korean Patent Application No. 10-20153-0157157 (with English Translation), 11 pages.
Indian Office Action dated Oct. 25, 2021 in Indian Patent Application No. 201344051013, 6 pages.
Office Action dated Apr. 13, 2021 in corresponding Japanese Patent Application No. 2019-210209 (with English Transiation), 7 pages.
Office Action dated Dec. 8, 2020 in corresponding Japanese Patent Application No. 2019-2102053 (with English Translation), 10 pages.

* cited by examiner

METHOD FOR BRAZING TITANIUM ALLOY COMPONENTS WITH ZIRCONIA-BASED CERAMIC COMPONENTS FOR HOROLOGY OR JEWELLERY

CROSS-REFERENCE TO RELATED APPLICATION

This application claims priority to European Patent Application No. 18212595.5 filed on Dec. 14, 2018, the entire disclosure of which is hereby incorporated herein by reference.

FIELD OF THE INVENTION

The invention concerns a method for brazing a first ceramic component and a second metal alloy component, to make a structural and/or external timepiece element.

The invention also concerns a watch including at least one structural and/or external element made by the method according to the invention.

The invention concerns the fabrication of structural and/or external timepiece elements, in particular for watches. It more particularly concerns the field of composite elements resulting from the assembly of several materials, and, more particularly still, comprising ceramic material constituents.

BACKGROUND OF THE INVENTION

In horology, the assembly of ceramic components with other metal type components remains a difficult operation to manage properly to ensure perfect adherence over time. Indeed, it is generally a question of assembling three-dimensional components, which are several tens of millimetres to several millimetres thick, with connecting surfaces which are mainly skew surfaces, often with precise positioning and centring, in particular in terms of symmetry, such as axial symmetry on a watch case, or lateral symmetry on bracelet elements.

Current techniques for assembling ceramic, especially zirconia-based ceramic, and metal alloys for such timepiece applications are press fit, adhesive bonding (polymer adhesive) and screw fit. These technologies can weaken the components and cannot guarantee adherence over time.

Various documents address this issue:

JP S63249085A SEIKO EPSON KYOCERA discloses a method for brazing a zirconia-based ceramic component with another metal alloy component, particularly a titanium alloy, for a timepiece application;

WO99/58332A1 PACIFIC COAST TECHNOLOGIES discloses methods for sealing an interface surface made of ceramic materials, such as zirconia, on an interface made of metal materials, such as titanium-containing materials, using titanium/nickel braze materials. The preferred ceramics include stabilised zirconia materials; the preferred metals include alloys of titanium and niobium; and a preferred titanium/nickel braze material is a 50:50 titanium/nickel alloy. Braze materials containing titanium, nickel and niobium are used to join ceramic materials to niobium-free metal materials. At least one of the interfaces is placed in contact with the titanium/nickel braze material and sealing is performed under vacuum conditions at temperatures comprised between 900 and 1200° C. while pressure is applied to the joint. The methods are suitable for hermetic sealing applications in implantable medical devices, electrical connectors, electronic cases, sports articles, structural components;

WO2017/129705A1 MORGAN ADVANCED CERAM. INC. discloses a method for brazing a sintered zirconia ceramic body that includes the steps consisting in providing a sintered zirconia ceramic body having a surface, chemically reducing the sintered zirconia ceramic body in whole or in part to form a reduced surface with respect to the sintered zirconia ceramic body, applying a braze material to at least one part of the reduced surface to form an assembly comprising said braze material and sintered zirconia ceramic body, heating said assembly to a temperature sufficient to at least partially melt the braze material such that the braze material wets the reduced surface, and cooling the assembly to solidify the braze material;

EP3243593A1 PNL HOLDING discloses a method for brazing a metal element on a surface of a zirconia part, comprising the steps of:—degrading the surface condition of the part to allow adhesion of a first metallization layer,—cleaning the part to remove impurities from its surface,—depositing on the surface of the part a first metallization layer containing mostly titanium,—depositing on the first metallization layer a second metallization layer containing mostly niobium,—placing the element against the second metallization layer,—depositing a gold braze on the element and the second metallization layer,—cooling the brazed area in a temperature controlled manner,—a stress relief heat treatment being carried out under load on the metal element before brazing;

FR2862246A1 EADS SPACE TRANSP GmbH discloses a method which consists in structuring, prior to brazing, at least one of the ceramic surfaces by creating a series of holes in its surface, using a Nd/Yag laser beam or mechanical means. The holes have a mean diameter of more than 550 mcm and are in two classes which differ in their geometrical shape, diameter or depth. A number of holes in each class make up a geometrical group and the spacing between the centres of the holes in one group is smaller than the spacing between the centre of the holes in the other. When the ceramic surfaces are fibre-reinforced and laminated, the holes are made to a depth at least equivalent to that of the laminated layer;

EP2789597 ALSTOM TECHNOLOGY Ltd. discloses a method for obtaining a configuration for joining a ceramic layer comprising a thermal insulating material to a metal layer, the configuration comprising an interface layer made of metallic material, located between the ceramic layer and the metallic layer, comprising a plurality of interlocking elements on one of its sides, facing the ceramic layer, the ceramic layer including a plurality of cavities intended to be connected to the corresponding interlocking elements of the interface layer, the configuration also comprising a braze layer by means of which the interface layer is joined to the metallic layer;

EP2799411A1 COMADUR discloses a method for fabricating a bright orange zirconia-based item, characterized in that it includes the successive steps consisting in making a first mixture containing a zirconia powder, 3 to 20% by weight of at least one stabilizer chosen from the group of oxides including yttrium oxide, magnesium oxide and calcium oxide, alone or in combination, 0.1% to 5% by weight of at least one element intended to form a vitreous phase, and chosen from the group including silicon oxide, aluminium oxide, lithium oxide and yttrium oxide, alone or in combination, 1% to 6% by weight of a cerium oxide powder; making a second mixture containing said first mixture and a binder, making a granulated mixture by granulating said second mixture; forming a green body by giving the second granulated mixture the shape of the desired item; air-sintering for at least 30 minutes at a temperature comprised between 1,250 and 1,500° C. and annealing the desired item at a temperature comprised between 700° C. and 1,350° C. for a period comprised between 30 minutes and 20 hours in a reducing atmosphere, and polishing said sintered green body.

Other indications are provided by the article of Sonia Simoes 'Recent progress in the joining of titanium alloy to ceramics', METALS, published on Oct. 26, 2018.

SUMMARY OF THE INVENTION

The invention proposes to solve the assembly of metal alloy timepiece components to ceramic components, without using mechanical stresses or polymer adhesive and thus give the assembly better mechanical properties.

The invention also proposes to make such an assembly by direct brazing, without any prior thin film metallization of the opposing components, in order to control production costs.

The object of the invention is to assembly components made of such an alloy with ceramic components by a controlled atmosphere brazing process. The principle is to:
make at least one (undercut) recess in a ceramic substrate;
deposit the braze material inside this recess and over the entire surface that one wishes to braze;
add the metal alloy component that one wishes to braze, and precisely position it;
heat the assembly to the appropriate temperature to melt the braze material and to form the braze between the two components.

To this end, the invention concerns a method for brazing a first ceramic component and a second metal alloy component, to make a structural and/or external timepiece element, according to claim 1.

More particularly, the invention concerns a method for brazing, in at least one junction area, between at least a first bearing surface comprised in a first zirconia-based ceramic component, and at least a second bearing surface comprised in a second titanium alloy component, in order to make a structural and/or external element for horology or jewellery, according to claim 2.

The invention also concerns a watch including at least one structural and/or external element made by the method according to the invention.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
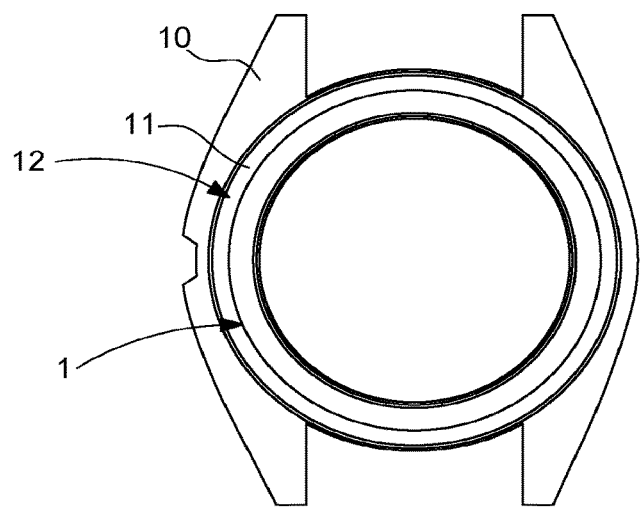
FIG. 1 represents a schematic plan view of a first untreated component, formed here by a zirconia-based ceramic watch case middle.
Figure 2:
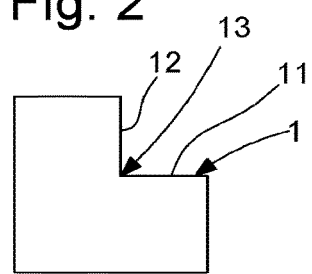
FIG. 2 represents a schematic sectional view in a radial plane, of a detail of the case middle of FIG. 1, on a first bearing surface for receiving a second component, which here is a ring.
Figure 3:
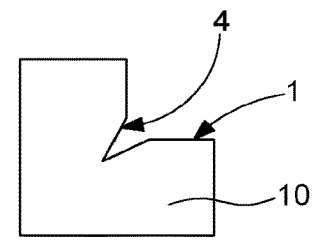
FIG. 3 represents, in a similar manner to FIG. 2, an arrangement of this case middle according to the invention, with a first recess in its thickness, set back from the first bearing surface.

The invention concerns a method for brazing a first ceramic component 10 and a second metal alloy component 20, to make a structural and/or external timepiece element 100.

According to the invention, a zirconia-based ceramic is chosen for first ceramic component 10, and a titanium alloy is chosen for second metal alloy component 20.

Indeed, brazing between ceramics suitable for external timepiece components and metal alloys is a difficult operation, and numerous tests carried out have highlighted the essential nature of close thermal behaviour between the ceramic and the metal alloy.

The method explained hereinafter can be used for other ceramics, like silicon nitride-based ceramics, or others, and/or for other alloys like stainless steels or other alloys, but with very different expansion and shrinkage behaviour, which impairs the quality of the brazing operation, which explains the deliberate choice to pair the zirconia-based ceramic with a titanium alloy, to produce a good quality braze, and especially excellent adherence over time.

Zirconia is a material with many advantageous properties but is totally non-reactive to the other elements. Consequently, brazing, whose principle is based on reactions between the elements (braze material and components), is a very difficult operation to perform. Selecting a suitable metal alloy, compatible with horological constraints in terms of health safety, strength, resistance to ageing, quality of appearance, is not obvious. Since brazing occurs at the melting temperature of the braze material, the thermal expansion coefficients of the two assembled elements must be very close to one another, as is the case of zirconia and titanium, to avoid any risk of breakage or deformation of the components.

Titanium alloys, at least those devoid of nickel, satisfy the aforementioned conditions, and are suitable for brazing, assembled with a zirconia-based ceramic, according to the invention.

With other ceramics and other metal alloys, the problem is similar, but assembly by means of brazing is impossible in most cases, or at least very difficult to implement, although the operating mode of the method disclosed hereinafter is theoretically possible for other ceramic/metal alloy pairs.

More particularly, according to the invention, at least a first recess 4 is made inside first component 10, set back with respect to a first bearing surface 1 in a junction area 3 with a second bearing surface 2 of second component 20, braze material 5 is deposited on this first bearing surface 1 and inside each recess 4, second surface 2 is positioned in alignment with first surface 1 to form an assembly, and this assembly is heated in a controlled atmosphere to a temperature higher than the melting temperature of braze material 5, to form the braze between second component 20 and first component 10 in junction area 3.

More particularly, this brazing method is implemented, in at least one junction area 3, between at least a first bearing surface 1 comprised in a first zirconia-based ceramic component 10, and at least a second bearing surface 2 comprised in a second titanium alloy component 20, in order to produce such an element 100. This second bearing surface 2 is at least partially complementary to first bearing surface 1.

According to the invention, first component 10 and/or respectively second component 20 is arranged, by making, set back from its first bearing surface 1, and/or respectively its second bearing surface 2, at least a first recess 4 of the tapered drilling or slit or groove type, and/or respectively a second recess 7, forming a receptacle arranged to allow a braze material 5 to penetrate deep inside first component 10, and/or respectively of second component 20, set back from first bearing surface 1, and/or respectively second bearing surface 2, and to facilitate the mechanical adhesion of braze material 5 inside first component 10, and/or respectively second component 20.

To this end, there is chosen a braze material 5 compatible at least with the titanium alloy of the second component, in particular but not limited to a grade 5 titanium alloy.

First component 10 and/or respectively second component 20 is prepared by depositing braze material 5 on first bearing surface 1 and inside each first recess 4 set back from first bearing surface 1, and/or respectively on second bearing surface 2 and inside each second recess 7 set back from second bearing surface 2.

Second surface 2 of second component 20 is positioned in alignment with first surface 1 of first component 10, to form an assembly. This assembly is then heated in a controlled atmosphere to a temperature higher than or equal to the melting temperature of braze material 5, to form the braze between second component 20 and first component 10 in junction area 3.

Advantageously, several recesses 4 are made, geometrically distributed in junction area 3 to perform a kind of stapling of second component 20 to first component 10. For example, in order to braze a ring around a shoulder of a case middle, at least three, or more particularly, at least four such recesses 4 are made to ensure good relative adherence of the two components.

In a variant, a plurality of discontinuous first recesses 4 and/or respectively of second recesses 7, are made in junction area 3.

In another variant, a single continuous recess 4 is made in junction area 3. More particularly, this single recess 4 follows a closed contour around first surface 1 of first component 10.

In a particular implementation, first recesses 4 are made only in first component 10, in order to keep the most possible material of second component 20 in junction area 3. First component 10 is then arranged by making at least a first recess 4 of the tapered drilling or slit or groove type, set back from its first bearing surface 1, first recess 4 forming a receptacle arranged to allow a braze material 5 to penetrate deep inside first component 10, set back from first bearing surface 1, and to facilitate the mechanical adhesion of braze material 5 inside first component 10. A braze material 5 compatible with the titanium alloy is chosen. First component 10 is prepared by depositing braze material 5 on first bearing surface 1 and inside each first recess 4 set back from first bearing surface 1. Second surface 2 of second component 20 is positioned in alignment with first surface 1 of the first component 10 thus prepared, to form an assembly. This assembly is heated in a controlled atmosphere to a temperature higher than or equal to the melting temperature of braze material 5, to form the braze between second component 20 and first component 10 in junction area 3.

Figure 8:
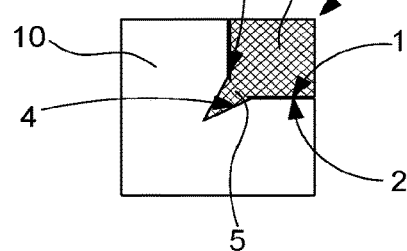
FIG. 8 represents, in a similar manner to FIG. 7, this assembly after the brazing operation has been carried out in a controlled atmosphere furnace, particularly under argon atmosphere.
Figure 9:
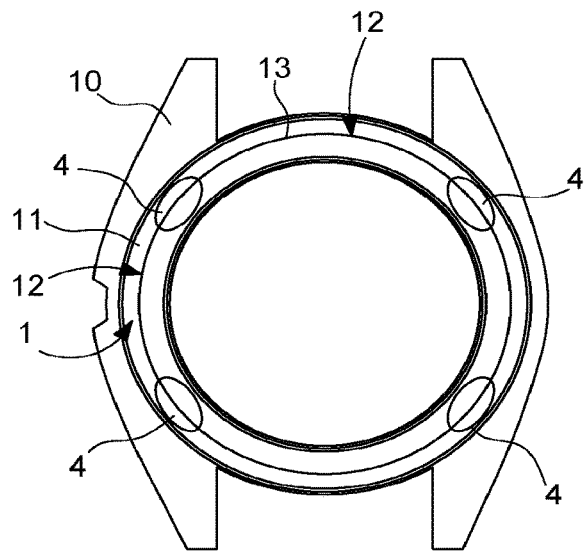
FIG. 9 represents, in a similar manner to FIG. 1, this case middle with four recesses in proximity to the horns.
Figure 11:
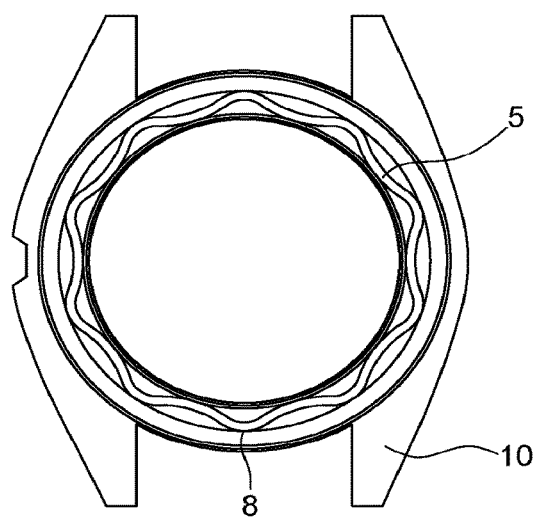
FIG. 11 represents, in a similar manner to FIG. 9, the case middle once the braze material is deposited in the recess, and on the first bearing surface a wave pattern.

More particularly, at least a first bearing surface 1 of first component 1 is made, with at least two first basic surfaces 11, 12, which are secant on at least a first line of intersection 13, and at least a first recess 4 is made on a first line of intersection 13. For example, as seen in FIGS. 8 and 9, a first basic surface 11 is a plane surface, a second basic surface 12 is cylindrical, and intersection line 13 is a circle, and recesses 4 encroach both on first basic surface 11, second basic surface 12, and intersection line 13.

Figures 5, 6:
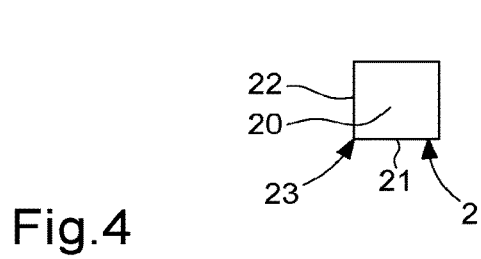
FIG. 5 represents, in a similar manner to FIG. 2, the second component, here consisting of a titanium alloy ring, in particular a grade 5 titanium alloy, and comprising a second bearing surface arranged to cooperate in an at least partially complementary manner with the first bearing surface of the case middle, in a junction area.
FIG. 6 represents, in a similar manner to FIG. 5, a variant preparation of the second component, with a second recess in its thickness, set back from its second bearing surface.
Figure 4:
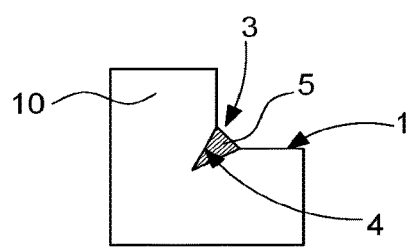
FIG. 4 shows, in a similar manner to FIG. 3, the braze deposited in this recess.
Figure 7:
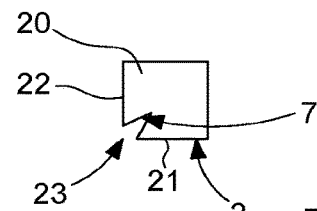
FIG. 7 represents, in a similar manner to FIG. 4, the insertion of this ring, in a direction of insertion, on this case middle, to create an assembly ready to be placed in the furnace.

Likewise, at least a second bearing surface 12 can be made in a second component 20 with at least two basic surfaces 21, 22, secant on at least a second line of intersection 23 located in junction area 3, as seen in FIG. 5.

In the alternative where second component 20 is also provided with one or more second recesses 7, more particularly, at least one such second recess 7 is made on a second line of intersection 23.

More particularly, braze material 5 is chosen to be compatible both with the titanium alloy and the zirconia-based ceramic, when this is possible.

More particularly, first component 10 and second component 20 are ultrasonic cleaned prior to the brazing operation.

More particularly, the assembly is mechanically held tightly pressed in the vicinity of the junction area 3 during the brazing operation.

More particularly, a brazing paste is chosen as braze material 5, which is inserted under pressure at least inside each first recess 4, and/or respectively in each second recess 7 (where appropriate), set back from first surface 1 and/or respectively from second surface 2.

Figure 13:
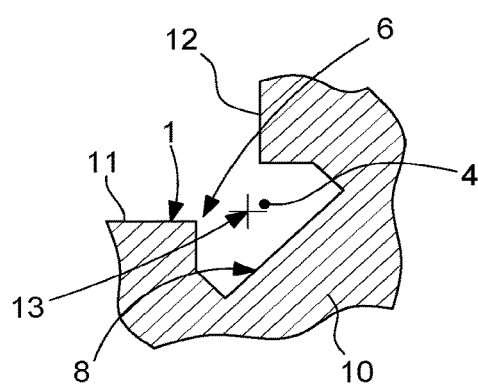
FIG. 13 represents, in a similar manner to FIG. 10, a first recess with a profile wherein the neck is narrower than bottom of the recess.
Figure 14:
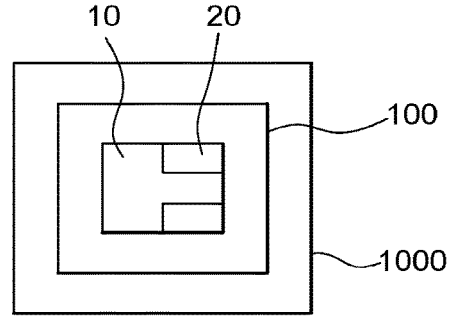
FIG. 14 is a block diagram representing a watch comprising at least one structural and/or external element made by the method according to the invention.

More particularly, as seen in FIG. 13, at least a first recess 4 is made with a neck 6 in proximity to first surface 1, wherein the cross-section of neck 6 is smaller than the cross-section of bottom 8 of first recess 4 opposite first surface 1, to form a mechanical key holding second component 20 to first component 10 after the brazing operation.

More particularly, each first recess 4 is made with such a neck 6 in proximity to first surface 1, wherein the cross-section of neck 6 is smaller than the cross-section of bottom 8 of first recess 4 opposite first surface 1, to form a mechanical key holding second component 20 to first component 10 after the brazing operation.

In a variant, a single direction of insertion DI of second component 20 is determined for its alignment with first component 10, and at least a first recess 4 is made oblique or perpendicular to direction of insertion DI. More particularly still, each first recess 4 is made oblique or perpendicular to direction of insertion DI.

In another variant, a single direction of insertion DI of second component 20 is determined for its alignment with first component 10 and at least a first recess 4 is made in direction of insertion DI.

More particularly, a single direction of insertion DI of second component 20 is determined for its alignment with first component 10, and first surface 1 and second surface 2 are made with a radial clearance JR between them, in the free state before the deposition of braze material 5; said radial clearance JR is comprised between 0.010 mm and 0.040 mm at the radius, perpendicularly to direction of insertion DI. More particularly still, first surface 1 and second surface 2 are made with a radial clearance JR between them, in the free state before the deposition of braze material 5; said radial clearance JR is comprised between 0.015 mm and 0.025 mm at the radius, perpendicularly to direction of insertion DI.

More particularly, braze material 5 is inserted in each first recess 4 by means of a syringe.

More particularly, a braze material suitable for brazing tungsten carbide on steel is chosen as braze material 5.

More particularly, braze material 5 is chosen to include copper, manganese and nickel, and to be cadmium free, with extra-fine grain size, and to include a binder for brazing in a controlled atmosphere furnace at a temperature comprised between 1000° C. and 1100° C.

More particularly, controlled atmosphere heating is carried out for the brazing operation in an argon controlled atmosphere furnace comprising a belt with a speed into the furnace comprised between 0.15 m/mn and 0.25 m/mn.

More particularly, after the brazing operation, a first cooling operation is carried out on a belt with a belt speed of between 0.05 m/mm and 0.15 m/mm.

More particularly, the brazing and/or first cooling is carried out with a solid tool mechanically holding the assembly, and/or with a weight at least equal to that of the assembly placed and held on the assembly, to slow down the cooling of the assembly after the brazing operation.

More particularly, after brazing, the assembly is placed on a graphite support for rapid cooling without thermal shock.

More particularly, after brazing and/or the first cooling operation, the assembly is placed on a graphite support for rapid cooling without thermal shock.

Figure 10:
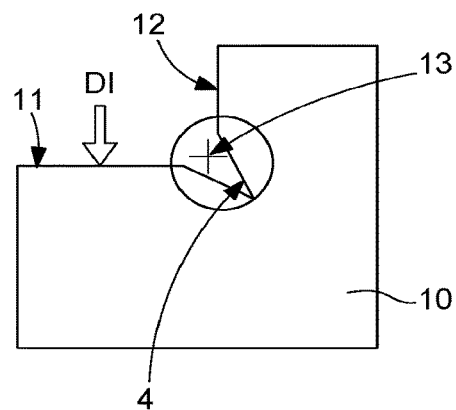
FIG. 10 represents, in a similar manner to FIG. 3, a first recess with a peaked profile, oblique with respect to the direction of insertion, and also oblique with respect to the basic surfaces forming the first bearing surface of the case middle, after, for example, laser machining.
Figure 12:
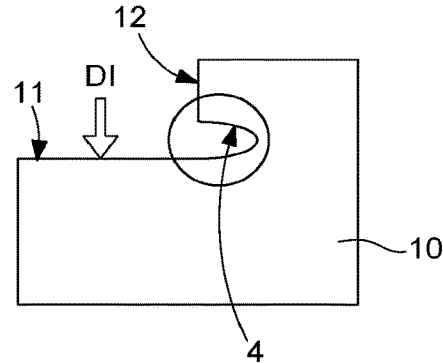
FIG. 12 represents, in a similar manner to FIG. 10, a first recess with a rounded profile, perpendicular with respect to the direction of insertion, and also oblique with respect to one of the basic surfaces forming the first bearing surface of the case middle, after, for example, mechanical machining of an undercut.

More particularly, braze material 5 is deposited on first surface 1 and/or respectively on second surface 2, in a wave pattern 8, as seen in FIG. 10.

More particularly, at least a first recess 4 is made during the fabrication of first ceramic component 10, in particular this first recess 4 is made in the mould.

More particularly, at least one first recess 4 is completely machined, or finish-machined using a laser.

More particularly, at least one first recess 4 is completely machined or finish-machined mechanically using a tool or grinding wheel.

More particularly, grade 5 titanium is chosen as the titanium alloy. This grade 5 titanium includes, in % according to ASTM F136, from 0.00 to 0.08 C, from 0.0 to 0.3 Fe, from 0.0000 to 0.0125 H, from 0.00 to 0.05 N, from 0.0 to 0.2 O, from 5.50 to 6.75 Al, from 3.5 to 4.5 V, from 0.0 to 0.1 OE (other elements, each), from 0.0 to 0.4 TO (total other elements), and the remainder of Ti.

More particularly, the zirconia-based ceramic is chosen to include:
at least one stabilizer chosen from the group of oxides comprising yttrium oxide, magnesium oxide, and calcium oxide, alone or in combination;
at least one element intended to create a vitreous phase, and chosen from the group comprising silicon oxide, aluminium oxide, lithium oxide and yttrium oxide, alone or in combination;
an oxide powder used as pigment;
and a zirconia powder forming the remainder to 100% by weight.

More particularly, the zirconia-based ceramic is chosen to contain:
3 to 20% by weight of at least one stabilizer chosen from the group of oxides comprising yttrium oxide, magnesium oxide and calcium oxide, alone or in combination;
0.1 to 5% by weight of at least one element intended to create a vitreous phase, and chosen from the group comprising silicon oxide, aluminium oxide, lithium oxide and yttrium oxide, alone or in combination;
1 to 10% by weight of an oxide powder used as pigment;
and a zirconia powder forming the remainder to 100% by weight.

The invention is more particularly illustrated with the brazed assembly of titanium alloy rings, in particular grade 5 titanium, on zirconia-based ceramic watch case middles. Trials show that an important parameter is the clearance, before brazing, between the case middle and the ring, which is necessary to allow proper thermal expansion, without undesired deformation. In particular, for a case middle with an assembly shoulder of around 37 mm, the clearance is advantageously comprised between 0.01 and 0.04 mm, and preferably close to 0.02 mm at the radius, between the case middle and the ring. Naturally, this low clearance value requires reduced machining tolerances, synonymous with cost.

It is possible to make undercut recesses with a laser. The object of these undercut recesses 4 is to create areas of mechanical adhesion, which reinforce the braze. Undercut recesses 4 may be located only in certain areas, for example in proximity to the horns of the case middle as seen in FIG. 8.

Brazing is correctly implemented with a CF CuMn3 braze material and with an argon controlled atmosphere furnace.

Good brazing conditions are as follows:
speed into the furnace: 20 cm/min (desired speed);
cooling speed: 10 cm/min (desired speed);
brazing under argon atmosphere;
furnace temperature: desired temperature of 1050° C.

The operating protocol includes all the steps performed to obtain the final product.

The braze material is deposited on case middle 10 based on the location of ring 20, and to the walls, and inside the previously made recesses 4. Further, it is advantageously deposited in the form of waves 8, as seen in FIG. 10.

Ring 20 is then positioned on the braze material.

When entering the furnace, to avoid ring 20 moving during thermal expansion, it is advantageous to place a weight on the ring, for example a weight equivalent to that of case middle 10. This weight also stabilises the assembly as the belt moves into the furnace. And especially, the presence of this weight allows the components to cool more slowly, especially the titanium ring. This subjects the assembly to less stress by limiting the effects of thermal expansion coefficients. It is observed, also, that the placing such a weight on the grade 5 titanium ring during cooling gives the ring some protection against oxidation.

On leaving the furnace, the brazed components are advantageously placed on a graphite stand to avoid thermal shock, and an additional weight, which is also of the order of magnitude of the weight of the case middle, is used to hold the ring securely in the bottom of the case middle during this more rapid cooling operation.

The presence of such undercut recesses is essential to ensure the adherence of the assembly, since, otherwise, the braze adheres to the titanium but does not properly adhere to the ceramic. Without the anchoring function performed by the weight of braze material 5 inside recesses 4, the ring would rise up as the components cooled, because of the difference in cooling speed of the two materials. This confirms that sufficiently slow cooling must be maintained to reduce to a maximum the stresses imparted by thermal expansion. It is also noted that the ring also tends to rise up because of the braze material which forms a thin interface layer between the titanium and the zirconia-based ceramic.

As a result of the undercut recesses 4, the undercuts serve as a mechanical anchor for the ring, since the braze material creates a metal support which holds the two components together.

Brazing grade 5 titanium rings on ceramic case middles is thus possible and gives good results in removal resistance tests.

The improvement of the method also involves optimising the sizing of the components, and in particular a reduction in the cross-section of the titanium rings, with a cross-section on the order of 0.75 to 1.00 mm.

The invention also concerns a watch 1000 including at least one structural and/or external element 100 made by the method according to the invention.

In short, the invention provides a durable, high quality assembly between grade 5 titanium components and zirconia-based ceramic components, with a method for controlled atmosphere brazing. It differs from other techniques in that material is added in the form of a brazing paste in the assembly step. Further, the invention ensures better mechanical and thermal properties for the assembly compared to usual technologies.

In the method, the brazing paste melts with the grade 5 titanium, which makes it possible to form a metal extension of the titanium component, but it does not react with the ceramic. Thus, all the mechanical and thermal resistance properties are defined by the braze, and by the quality of the anchoring thereof inside the recesses made in the ceramic component.

The invention claimed is:

1. A method for brazing a first ceramic component and a second metal alloy component, for making a structural and/or external timepiece element,
   the first ceramic component comprising a zirconia-based ceramic and the second metal alloy component comprising a titanium alloy,
   the method comprising:
   making at least one first recess inside the first ceramic component, set back with respect to a first bearing surface in a junction area with a second bearing surface of the second metal alloy component,
   depositing a braze material on the first bearing surface and inside each of the at least one first recess,
   positioning the second bearing surface in alignment with the first bearing surface to form an assembly,
   heating the assembly in a controlled atmosphere at a temperature higher than a melting temperature of the braze material, to form a braze of the second metal alloy component to the first ceramic component in the junction area, and
   making the second bearing surface in the second metal alloy component having at least two surfaces, secant on at least a second line of an intersection located in the junction area,
   wherein the first bearing surface of the first ceramic component has at least two first surfaces, secant on at least a first line of intersection, and the at least one first recess is made on the first line of intersection.

2. The brazing method according to claim 1, wherein the brazing is carried out in at least one junction area, between the first bearing surface comprised in the first ceramic component and the second bearing surface comprised in the second metal alloy component, which is at least partially complementary to the first bearing surface, and
   wherein the first ceramic component and/or respectively the second metal alloy component is arranged, by making, set back from the first bearing surface and/or respectively the second bearing surface, the at least one first recess of a tapered drilling, a slit or groove, and/or respectively at least one second recess, forming a receptacle arranged to allow the braze material to penetrate inside the first ceramic component, and/or respectively the second metal alloy component, set back from the first bearing surface, and/or respectively the second bearing surface, and to facilitate mechanical adhesion of the braze material inside the first ceramic component, and/or respectively the second metal alloy component, wherein the braze material is compatible at least with the titanium alloy, wherein the first ceramic component and/or respectively the second metal alloy component is prepared by depositing the braze material on the first bearing surface and inside each of the at least one first recess set back from the first bearing surface, and/or respectively on the second bearing surface and inside each of the at least one second recess set back from the second bearing surface, and wherein the second bearing surface of the second metal alloy component is positioned in alignment with the first bearing surface of the first ceramic component, to form an assembly, and wherein the assembly is heated in a controlled atmosphere to a temperature higher than or equal to the melting temperature of the braze material, to form the braze between the second metal alloy component and the first ceramic component in the junction area.

3. The brazing method according to claim 1, wherein the first ceramic component is arranged by making the at least one first recess of a tapered drilling, a slit or groove, set back from the first bearing surface, the first recess forming a receptacle arranged to allow the braze material to penetrate inside the first ceramic component, set back from the first bearing surface, and to facilitate a mechanical adhesion of the braze material inside the first ceramic component, wherein the braze material is compatible with the titanium alloy, wherein the first ceramic component is prepared by depositing the braze material on the first bearing surface and inside each of the at least one recess set back from the first bearing surface, wherein the second bearing surface of the second metal alloy component is positioned in alignment with the first bearing surface of the first ceramic component, to form an assembly, and wherein the assembly is heated in a controlled atmosphere to a temperature higher than or equal to the melting temperature of the braze material, to form the braze between the second metal alloy component and the first ceramic component in the junction area.

4. The method according to claim 2, wherein the at least one second recess is made on the second line of intersection.

5. The method according to claim 1, wherein the assembly is mechanically held pressed in the junction area during the brazing.

6. The method according to claim 1, wherein the braze material is in the form of a brazing paste, which is inserted under pressure in each of the at least one first recess, set back from the first bearing surface.

7. The method according to claim 1, wherein the at least one first recess is made with a neck, wherein a cross-section of the neck is smaller than a cross-section of a bottom of the at least one first recess facing the first bearing surface, to form a key mechanically holding the second metal alloy component to the first ceramic component after the brazing.

8. The method according to claim 1, wherein a single direction of insertion (DI) of the second metal alloy component is determined for the alignment with the first ceramic component, and wherein the at least one first recess is made oblique or perpendicular to the direction of insertion (DI).

9. The method according to claim 1 wherein a single direction of insertion (DI) of the second metal alloy component is determined for the alignment with the first ceramic component, and wherein the first bearing surface and the second bearing surface are made with a radial clearance (JR) between them, in a state before the deposition of the braze material, wherein the radial clearance (JR) is from 0.010 mm and to 0.040 mm at the radius, perpendicularly to the direction of insertion (DI).

10. The method according to claim 9, wherein the first bearing surface and the second bearing surface are made with a radial clearance (JR) between them, in a state before the deposition of the braze material, wherein the radial clearance (JR) is from 0.015 mm and to 0.025 mm at the radius, perpendicularly to the direction of insertion (DI).

11. The method according to claim 1, wherein the braze material is suitable for brazing tungsten carbide on steel.

12. The method according to claim 1, wherein the braze material is copper, manganese, nickel, or a combination thereof, and is cadmium free, and includes a binder for brazing in a controlled atmosphere furnace at a temperature of from 1000° C. to 1100° C.

13. The method according to claim 1, wherein the at least one first recess is made during fabrication of the first ceramic component.

14. The method according to claim 1, wherein the at least one first recess is completely machined or finish-machined using a laser.

15. The method according to claim 1, wherein the at least one first recess is completely machined or finish-machined mechanically using a tool or grinding wheel.

16. The method according to claim 1, wherein a plurality of discontinuous first recesses is made in the junction area.

17. The method according to claim 1, wherein the titanium alloy is grade 5 titanium comprising, in % according to ASTM F136, from 0.00 to 0.08 of C, from 0.0 to 0.3 of Fe, from 0.0000 to 0.0125 of H, from 0.00 to 0.05 of N, from 0.0 to 0.2 of O, from 5.50 to 6.75 of Al, from 3.5 to 4.5 of V, from 0.0 to 0.1 of each of other elements (OE), from 0.0 to 0.4 of a total of other elements (TO), and Ti as a remainder.

18. The method according to claim 1, wherein the zirconia-based ceramic comprises:
   at least one stabilizer selected from the group consisting of oxides comprising yttrium oxide, magnesium oxide, and calcium oxide;
   at least one element for creation of a vitreous phase, and selected from the group consisting of silicon oxide, aluminium oxide, lithium oxide, and yttrium oxide;
   an oxide powder as a pigment; and
   a zirconia powder forming the remainder to 100% by weight.

19. The method according to claim 18, wherein the zirconia-based ceramic comprises:
   3 to 20% by weight of the at least one stabilizer;
   0.1 to 5% by weight of the at least one element;
   1 to 10% by weight of the oxide powder.

* * * * *